United States Patent
Camarena et al.

(10) Patent No.: US 10,471,553 B2
(45) Date of Patent: Nov. 12, 2019

(54) TOOL FOR EXTRACTING A METAL PIECE

(71) Applicant: SAFRAN AIRCRAFT ENGINES MÉXICO, S.A de C.V., Colon, Querétaro (MX)

(72) Inventors: Jesus Camarena, Querétaro (MX); Jesus Murillo, Santiago de Querétaro (MX); Allan Puente, Querétaro (MX); Gumaro Rodriguez, Querétaro (MX); Margarita Limon, Querétaro (MX)

(73) Assignee: SAFRAN AIRCRAFT ENGINES MÉXICO, S.A de C.V., Colon, Querétaro (MX)

( * ) Notice: Subject to any disclaimer, the term of this patent is extended or adjusted under 35 U.S.C. 154(b) by 251 days.

(21) Appl. No.: 15/499,044

(22) Filed: Apr. 27, 2017

(65) Prior Publication Data
US 2017/0312866 A1     Nov. 2, 2017

(30) Foreign Application Priority Data
Apr. 27, 2016  (FR) ..................................... 16 53754

(51) Int. Cl.
*B23P 6/00*   (2006.01)
*B25B 27/02*  (2006.01)
*B25B 27/04*  (2006.01)
*B25D 1/16*   (2006.01)
*F01D 25/28*  (2006.01)
(Continued)

(52) U.S. Cl.
CPC ............ *B23P 6/005* (2013.01); *B25B 27/023* (2013.01); *B25B 27/04* (2013.01); *B25D 1/16* (2013.01); *F01D 25/285* (2013.01); *B25D 2250/171* (2013.01); *F01D 9/04* (2013.01);
(Continued)

(58) Field of Classification Search
CPC ......... Y10T 29/53839; Y10T 29/53843; Y10T 29/5393; B25B 27/02; B25B 27/06; B25B 27/0035; B25B 27/028; B25D 1/16; B25D 2250/171; B21D 1/06
See application file for complete search history.

(56) References Cited

U.S. PATENT DOCUMENTS 1,518,068 A * 12/1924 Horn ........................ B25B 27/08
29/247
2,652,736 A *  9/1953 Kiene ....................... B25G 1/00
16/427

(Continued)

FOREIGN PATENT DOCUMENTS

WO    WO-2016004619 A1 *  1/2016  ............. B25B 13/12

OTHER PUBLICATIONS

Preliminary Search Report as issued in French Patent Application No. 1653754, dated Jan. 27, 2017.

*Primary Examiner* — Jason L Vaughan
(74) *Attorney, Agent, or Firm* — Pillsbury Winthrop Shaw Pittman LLP

(57) ABSTRACT

An extracting tool for extracting a metal piece located in an aerodynamic stream of a turbomachine, such as a flow splitter nose, includes a rod; a first stop located at a distal end of the rod and provided with a claw for bearing against a first edge of the metal piece; a gripping member translationally mounted to the rod and including a first projecting portion arranged to receive a second, opposite edge of the metal piece; a tightening mechanism configured to keep the gripping member bearing against the metal piece and the first stop.

12 Claims, 4 Drawing Sheets

(51) Int. Cl.
*F01D 9/04* (2006.01)
*F01D 25/24* (2006.01)

(52) U.S. Cl.
CPC ........ *F01D 25/246* (2013.01); *F05D 2220/32* (2013.01); *F05D 2230/70* (2013.01)

(56) References Cited

U.S. PATENT DOCUMENTS

| | | | | |
|---|---|---|---|---|
| 2,685,810 A * | 8/1954 | Wolbaum | ................ | B25B 13/12 81/176 |
| 2,779,089 A * | 1/1957 | Allen | ................ | B25B 27/02 173/91 |
| 3,280,455 A * | 10/1966 | Smith | ................ | B25B 27/02 29/254 |
| 3,357,286 A * | 12/1967 | Pooler, Jr. | ................ | B25B 13/12 81/145 |
| 3,739,452 A * | 6/1973 | Gadberry | ................ | B25B 27/02 29/254 |
| 3,945,104 A * | 3/1976 | Brookover, Jr. | ......... | B25D 1/16 29/255 |
| 4,211,446 A * | 7/1980 | Shultz, Sr. | .......... | B25B 27/0028 254/131 |
| 4,335,493 A * | 6/1982 | Shivers, Jr. | ............. | B25B 27/02 29/254 |
| 4,476,861 A * | 10/1984 | Dimakos | ................ | A61B 17/92 29/255 |
| 5,070,564 A * | 12/1991 | Fey | ................ | B66F 15/00 254/131 |
| 5,109,739 A * | 5/1992 | Hull | ................ | B25B 19/00 29/254 |
| 5,323,519 A | 6/1994 | Cloud | | |
| 7,168,144 B1 * | 1/2007 | Haelle | ................ | B25B 27/02 29/254 |
| 7,600,305 B2 * | 10/2009 | Ploeger | ................ | B25B 27/0028 254/131 |
| 7,954,217 B2 * | 6/2011 | Wu | ................ | B25B 27/0028 254/25 |
| 2003/0184030 A1 | 10/2003 | Carbonneau | | |
| 2004/0016096 A1 * | 1/2004 | Capoferi | ................ | B25B 27/0028 29/213.1 |
| 2004/0103511 A1 * | 6/2004 | Garst | ................ | B25B 27/0028 29/235 |
| 2004/0129437 A1 | 7/2004 | Walsh | | |
| 2005/0022631 A1 * | 2/2005 | Brazil | ................ | B25B 13/04 81/119 |
| 2010/0048370 A1 * | 2/2010 | Sollami | ................ | B23B 31/003 483/65 |
| 2010/0077696 A1 | 4/2010 | Campbell, Jr. | | |
| 2012/0073101 A1 * | 3/2012 | Giberti | ................ | B25F 1/003 29/254 |
| 2015/0239107 A1 * | 8/2015 | Sutton | ................ | B25B 13/481 81/155 |
| 2015/0260043 A1 * | 9/2015 | Holmes | ................ | F01D 25/285 29/889.1 |
| 2017/0157748 A1 * | 6/2017 | Wang | ................ | B25B 13/12 |

* cited by examiner

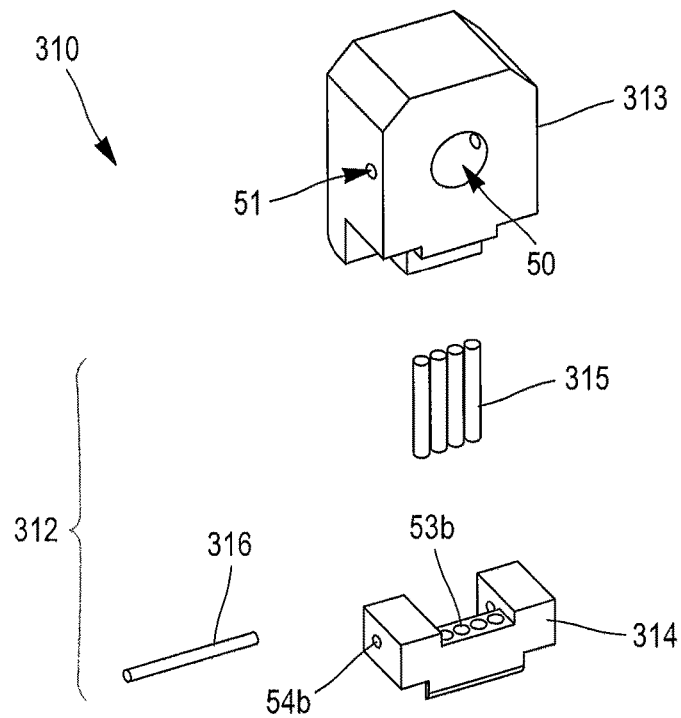
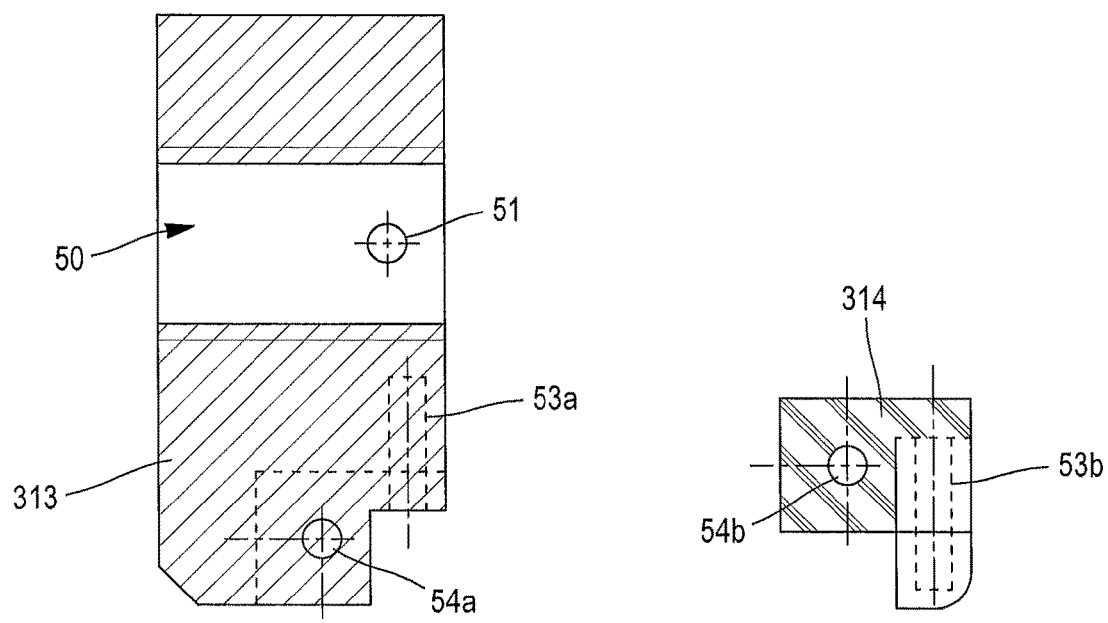
FIG. 4
FIG. 5A
FIG. 5B

TOOL FOR EXTRACTING A METAL PIECE

CROSS REFERENCES TO RELATED APPLICATIONS

This application claims priority to French Patent Application No. 1653754, filed Apr. 27, 2016, the entire content of which is incorporated herein by reference in its entirety.

FIELD

The present invention generally relates to the field of turbomachines, such as turbofan engines. The invention more particularly relates to a tool for extracting a metal piece located in an aerodynamic stream of a turbomachine.

BACKGROUND

FIG. 1 schematically represents the upstream part of a turbofan engine 10 with a known design. This turbojet engine 10 comprises a fan 11 which rotates about a longitudinal axis 12 of the turbojet engine. The fan 11 generates an inlet air flow which is divided in a primary flow FP and a secondary flow FS. Conventionally, the primary FP and secondary FS flows circulate from upstream to downstream of the turbojet engine. The primary flow FP, which corresponds to the central part of the inlet air flow, passes through a low pressure compressor 13, and then (in a downstream part of the turbojet engine not represented in FIG. 1) a combustion chamber and a turbine. The secondary flow FS, corresponding to the peripheral part of the inlet air flow, externally bypasses the compressor 13, the combustion chamber, the turbine, and retrieves the primary flow FP at the outlet of the turbojet engine 10. The secondary flow FS thus provides part of the thrust of the turbojet engine 10, after crossing a ring 14 of fixed vanes which is disposed downstream of the fan 11. This ring 14 is commonly called an outlet guide vane (OGV), because it enables the secondary flow FS to be guided in order to limit spinning thereof.

The primary flow FP and the secondary flow FS are annular air flows channelled by the stator casing 16 of the low pressure compressor 13 and the outer casing 17 of the turbojet engine 10. To that end, the casings 16-17 have cylindrical walls or shells which can be inner or outer depending on their positioning with respect to the aerodynamic stream they delimit.

The primary FP and secondary FS flows are separated by a splitter nose 15, making up the upstream end of the stator casing 16. This splitter nose 15, more precisely represented in a longitudinal cross-section view in FIG. 2, is a metal, generally aluminum, piece, with a low thickness. It makes the junction between an inner shell 20 and an outer shell 21. The inner shell 20, called an OGV shell, delimits the inside of the aerodynamic stream in which the secondary flow FS circulates and supports fixed vanes of the outlet guide vane 14. The outer shell 21 delimits the outside of the aerodynamic stream in which the primary flow FP circulates. Like the OGV shell 20, the outer shell 21 can support one or more circular rows 22 of fixed vanes, for guiding the primary flow FP.

The splitter nose 15, as other metal pieces having a profile longitudinal cross-section, has been assembled by shrink fitting to the turbojet engine 10. Yet, it may be necessary to disassemble the splitter nose 15 in case of problems in the final assembly.

The extracting tool currently used to disassemble the splitter nose 15 has a steel claw which is positioned on a shoulder 23 arranged at one end of the nose 15, on the side of the OGV shell 20. The nose 15 is then extracted from the turbojet engine 10 by exerting on the claw a tensile force directed upstream of the turbojet engine 10.

This tool does not ensure a good grip of the splitter nose 15, which consequently can fall off the turbojet engine 10 and be deformed. Further, since the nose 15 is of a low thickness and of aluminum, which is a readily deformable material, the steel claw of the extracting tool damages the nose 15 at its catch point: the shoulder 23. Such an extracting tool also may damage the OGV shell 20 in close proximity with the shoulder 23 of the splitter nose 15.

SUMMARY

An aspect of the invention is to extract a metal piece located in an aerodynamic stream of a turbomachine by tightly holding it, such that it cannot fall off the turbomachine. The metal piece can in particular be the flow splitter nose of a turbofan engine.

According to a first aspect of the invention, there is provided an extracting tool comprising:
a rod;
a first stop located at a distal end of the rod and provided with a claw for bearing against a first edge (or distal end) of the metal piece;
a gripping member translationally mounted to the rod and comprising a first projecting portion arranged to receive a second, opposite edge (or proximal end) of the metal piece;
a tightening mechanism configured to keep the gripping member bearing against the metal piece and the first stop.

Therefore, in addition to the claw located at the distal end of the rod, a gripping member provided with a projecting portion to grip a further edge of the metal piece has been provided. The metal piece is then held at two opposite ends by the extracting tool, which greatly reduces the risk that it falls off the turbomachine. Holding the metal piece upon being extracted is thus better with the tool of an embodiment of the invention than with the tool of prior art. Thanks to the fact that the gripping member is translationally mounted to the rod, the projecting portion of the gripping member can grip the second edge of the metal piece on each side, in the manner of pliers. Finally, the tightening mechanism prevents any movement between the gripping member and the stop located at the distal end of the rod, which avoids that the metal piece can escape from the claw and from the projecting portion.

Thanks to the tool according to the first aspect of the invention, the tensile strain exerted on the rod is entirely transmitted to the metal piece, which can consequently be extracted more readily from the turbomachine.

The claw of the first stop beneficially comprises a metal reinforcement surrounded by a polymeric material. This claw does not damage neither the metal piece to be extracted, nor the neighboring pieces of the turbomachine, because the polymeric material is more ductile than the metal making up the piece to be extracted. The polymeric material is for example polyamide 6 (or nylon 6).

The extracting tool according to one or more embodiments of the invention can also have one or more of the characteristics below, considered individually or according to any technically possible combinations:
the gripping member is comprised of a polymeric material;

the gripping member further comprises a second portion arranged to bear against a wall of the metal piece, when the first portion of the gripping member receives the second edge of the metal piece;

when the second edge of the metal piece is folded over itself, the first projecting portion of the gripping member is configured to snugly fit to the second folded edge of the metal piece;

the first projecting portion of the gripping member is hook-shaped;

the extracting tool further comprises a handle arranged in the gripping member;

the extracting tool further comprises a second stop located at a proximal end of the rod and an inertial mass translationally mounted to the rod between the second stop and the tightening mechanism; and the gripping member is rotationally mounted to the rod.

A second aspect of the invention relates to a method for extracting a metal piece by means of the extracting tool according to the first aspect of the invention. This method includes the following steps of:

positioning the claw of the first stop against a first edge of the metal piece;

moving the gripping member along the rod so as to grip a second opposite edge of the metal piece with the first projecting portion;

tightening the gripping member against the metal piece and the first stop by means of the tightening mechanism; and exerting on the claw a tensile force directed to a proximal end of the rod.

BRIEF DESCRIPTION OF THE FIGURES

Further characteristics and benefits of the invention will clearly appear from the description thereof given below, by way of indicating and in no way limiting purposes, in reference to the appended figures, in which:

FIG. 4 is a perspective exploded view of a stop disposed at a distal end of the extracting tool;

FIGS. 5A and 5B respectively represent, in a cross-section view, a metal body of the stop according to FIG. 4 and a cap of polymer to be mounted to the body of the stop to make up a claw.

For the sake of clarity, identical or similar elements are marked with identical reference signs throughout the figures.

DETAILED DESCRIPTION

In the description that follows, the terms "internal" or "inner" and "external" or "outer" refer to a positioning with respect to the axis of rotation, or longitudinal axis, of an axial turbomachine.

Figure 3:
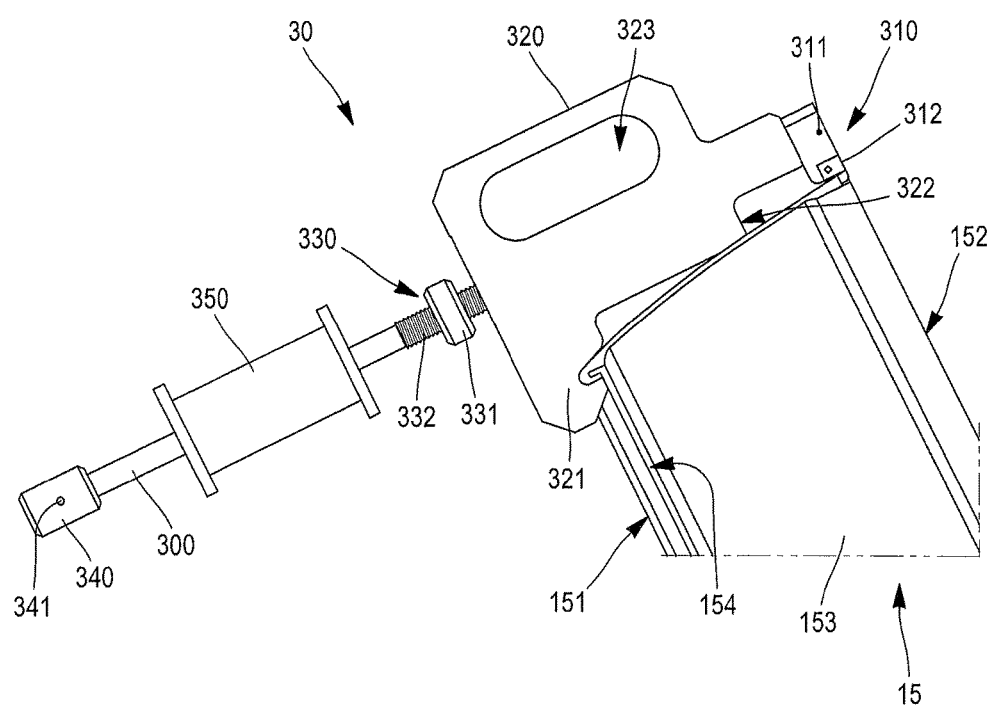
FIG. 3 illustrates an extracting tool according to an embodiment of the invention, when mounted to a metal piece to be extracted.

FIG. 3 represents an embodiment of a tool 30 for extracting a metal piece located in an aerodynamic stream of a turbomachine. The tool 30 has initially been designed to extract pieces having an axisymmetric shape with respect to the longitudinal axis of the turbomachine, such as the flow splitter nose of a turbofan engine. In practice, it has been realized that the tool 30 could remove any type of metal piece with a small thickness (for example from 3 mm to 6 mm) having a profile longitudinal cross-section. In particular, the tool 30 can be used to extract metal pieces mounted by shrink fitting in a turbomachine.

Like the extracting tool, the metal piece to be extracted has a proximal end (i.e. close to the operator which holds the extracting tool in his/her hand) and a distal end (i.e. at a greater distance from the operator), opposite to the proximal end. Depending on the orientation of the metal piece in the aerodynamic stream, these ends of the piece can also be referred to as upstream and downstream edges, in reference to the direction of the gas flow travelling the aerodynamic stream (from upstream to downstream).

The example of metal piece illustrated in FIG. 3 is a flow splitter nose 15. This nose has a circular upstream edge 151, a downstream edge 152, being also circular, and an annular wall 153 extending from the upstream edge 151 to the downstream edge 152. In a turbofan engine, the diameter of the upstream edge 151 determines the primary flow that can enter the low pressure compressor. The external surface of the tubular wall 153, being convex, delimits the inside of the secondary flow.

Figure 1:
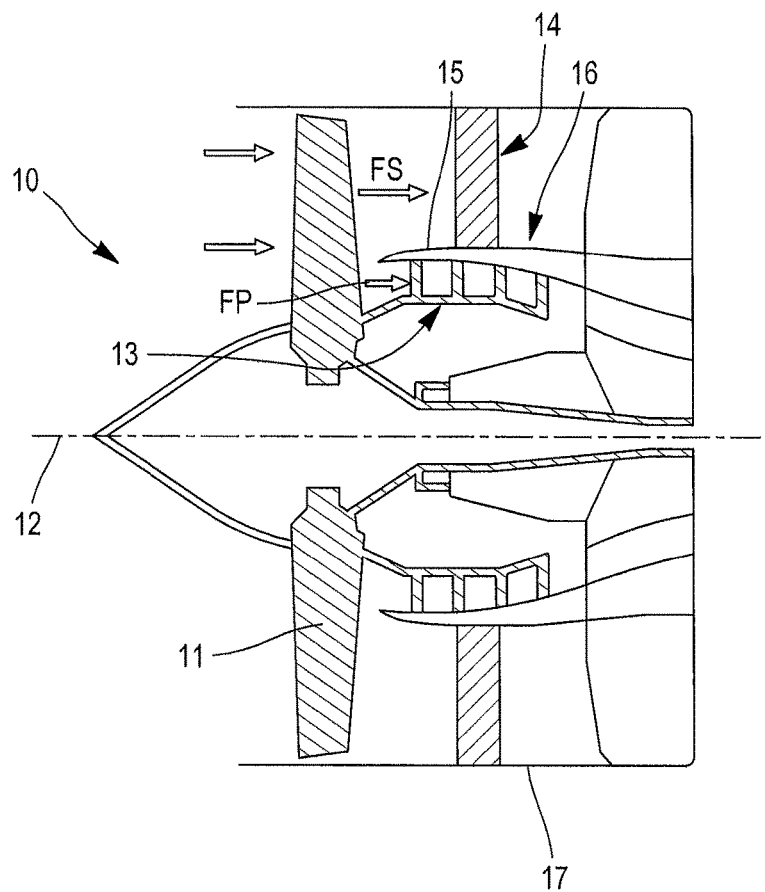
FIG. 1, previously described, is a schematic cross-section view of an upstream part of a turbofan engine according to prior art.
Figure 2:
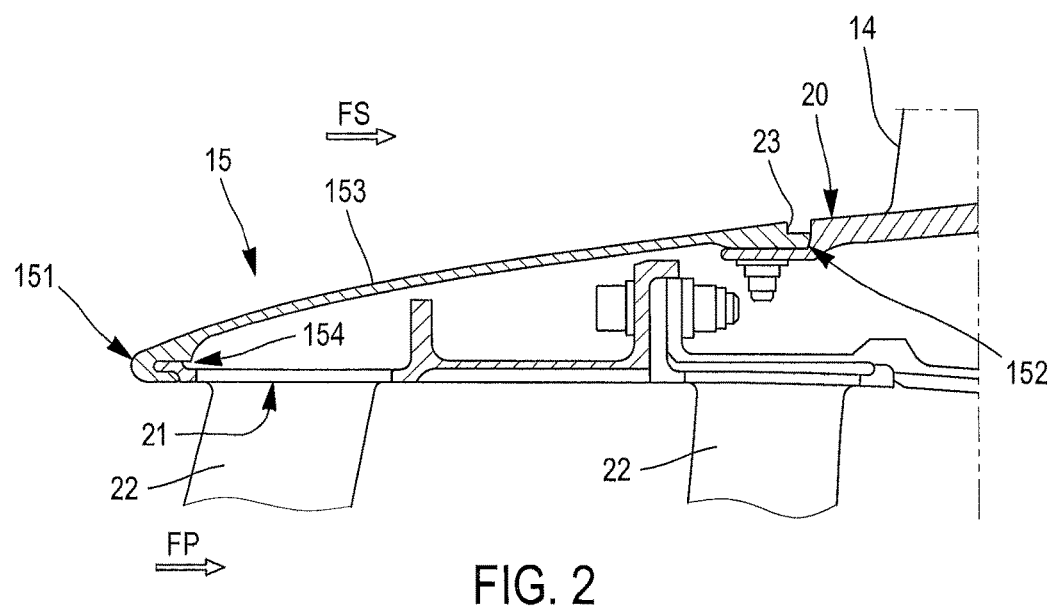
FIG. 2 represents in a longitudinal cross-section view the assembly of a flow splitter nose with an OGV shell to the low pressure compressor module of the turbojet engine.

As is visible in FIG. 2, the upstream edge 151 of the splitter nose 15 is for cooperating with an outer shell 21 delimiting the outside of the primary flow FP, whereas the downstream edge 152 is for cooperating with an inner shell 20 delimiting the inside of the secondary flow FS. In other words, the inner shell 20 is an extension of the annular wall 153 of the splitter nose 15. The inner shell 20 can support a row of fixed vanes of an outlet guide vane 14, as previously described. For the sake of clarity, the inner shell 20 and the outer shell 21 have not been reproduced in FIG. 3.

The extracting tool 30 comprises a rod 300, for example of steel, and a first stop 310 located at a distal end of the rod 300, that is on the side of the splitter nose 15 to be disassembled. The first stop 310 is for example attached to the rod 300 by means of a driver pin 311.

The first stop 310 is equipped with a claw 312 for bearing against the downstream edge 152 of the splitter nose 15. The downstream edge 152 is, in the embodiment, arranged to form a shoulder 23 (cf. FIG. 2) against which the claw 312 bears. As described hereinafter in connection with FIGS. 4 and 5B, the surface of the claw 312 in contact with the splitter nose 15 is formed by a more ductile material than the metal of the splitter nose 15. The splitter nose 15 being generally of aluminum or titanium, the contact surface of the claw 312 is beneficially of a polymeric material, for example polyamide 6 (PA6). Thus, the claw 312 may not deteriorate the downstream edge 152 of the splitter nose 15 when extracted.

In addition to the claw 312, the extracting tool 30 comprises a gripping member 320 translationally mounted to the rod 300. This gripping member 320 includes a first portion 321 arranged to receive the upstream edge 151 of the splitter nose 15, when the tool 30 is mounted to the nose. The first portion 321 projects from a central part of the member 320 which surrounds the rod 300, and further radially projects from the claw 312 of the stop 310 relative to the longitudinal axis d of the rod 300. Indeed, because of the convexity of the external surface of the wall 153 (the only accessible surface to disassemble the splitter nose 15), the part of the tool 30 which grips the upstream edge 151 (i.e. the first portion 321)

is farther from the rod 300 than the part of the tool 30 which grips the downstream edge 152 (i.e. the claw 312).

The gripping member 320 is translationally movable with respect to the rod 300. This enables the gripping member 320 to be temporarily moved away from the first stop 310, in order to let the splitter nose 15 pass between the claw 312 and the first projecting portion 321. Further, the member 320 is beneficially rotationally movably mounted to the rod 300. Thanks to these freedoms of movement of the gripping member 320, the extracting tool 30 can be easily mounted to the splitter nose 15.

Further, the gripping member 320 is beneficially comprised of a polymeric material, which is in this embodiment identical to the material of the claw 312. A gripping member of polymer rather than of steel avoids to deteriorate the upstream edge 151 of the splitter nose 15 (of aluminum). Thus, the extracting tool 30 is also lighter, which makes its transportation and use easier.

As illustrated in FIG. 3, the upstream edge 151 of the splitter nose 15 can be folded over itself, in order to define a circular internal groove 154. In the assembled turbojet engine (cf. FIG. 2), this circular internal groove 154 is used as a housing for the edge of one or more outer shell(s) 21. When the splitter nose 15 has such a folded edge, the first portion 321 of the gripping member 320 is beneficially configured to snugly fit to the fold of the upstream edge 151. The splitter nose 15 is thus more tightly held by the gripping member 320. In other words, the first portion 321 comprises an aperture having a substantially complementary shape to that of the upstream edge 151. For example, the first portion 321 is hook-shaped, the aperture of which can be entirely occupied by the upstream edge 151.

In the embodiment represented in FIG. 3, the gripping member 320 further comprises a second portion 322 arranged to bear against the external surface of the wall 153, when the upstream edge 151 of the nose is gripped by the first portion 321. The second portion 322 thus makes up a third bearing surface between the tool 30 and the splitter nose 15, which further improves holding of the nose 15.

A handle 323 is beneficially arranged in the gripping member 320. This handle 323 facilitates transportation and use of the extracting tool 30, in particular its installation to the splitter nose 15.

Finally, in the extracting tool 30 is provided a tightening mechanism 330 for preventing the gripping member 320 from being moved, when the splitter nose 15 is placed between the claw 312 and the first portion 321. The tightening mechanism 330 blocks the gripping member 320 against the first stop 310 and removes the possible clearance between the splitter nose 15 and both "jaws" that the claw 312 and the first portion 321 make. The gripping member 320 thus has dimensions such that, when in contact with the first stop 310, the distance between the claw 312 and the first projecting portion 321 is substantially equal to the distance separating the upstream 151 and downstream 152 edges of the splitter nose 15. By way of example, this distance is in the order of 150 mm in the real configuration represented in FIG. 2.

The tightening mechanism 330 includes for example a nut 331 mounted to the rod 300 through a thread 332. The thread 332 is in an embodiment limited to a central portion of the rod 300.

By holding the splitter nose 15 by its two opposite edges 151-152, the extracting tool of FIG. 3 reduces the risk that the nose falls off the turbojet engine when extracted and thus that it is deteriorated by falling off. Indeed, as long as the claw 312 is in position on the downstream edge 152 and that the tightening mechanism 330 presses the gripping member 320 against the upstream edge 151, the extracting tool 30 is secured to the splitter nose 15. Thereby, it is possible to pull on the rod 300 to extract the nose 15 from the turbojet engine, without the risk that the nose escapes from the jaws 321-322.

To exert a tensile force on the rod 300, and thus on the nose 15 through the claw 312, the tool 30 can include a second stop 340 located at a proximal end of the rod 300 (located opposite to the distal end) and an inertial mass 350 translationally mounted to the rod 300. The inertial mass 350 is located between the second stop 340 and the tightening mechanism 330. The second stop 340 is for example attached to the rod 300 by means of a pin 341.

The extraction force is generated when the inertial mass 350 is launched towards the second stop 340 and strikes the same stop. The rod 300, the second stop 340 and the inertial mass 350 thus form an inertial extractor called a slide hammer.

FIG. 4 illustrates an embodiment of the first stop 310 located at the distal end of the rod 300.

As represented in an exploded view, the first stop 310 comprises a body 313, for example of steel, a cap 314 of polymeric material, a set of metal strain pins 315 and a driver pin 316 enabling the cap 314 to be attached to the body 313.

The body 313, represented in a longitudinal cross-section view in FIG. 5A, is pierced with a bore 50 and a hole 51, oriented perpendicular to the bore 50 and opening into the same bore. The bore 50 is dimensioned to receive the distal end of the rod 300. The hole 51 is dimensioned to receive the driver pin 311 for attaching the first stop 310 to the rod 300. Further, the lower part of the body 313 is provided with housings 53a for all the strain pins 315.

The cap 314 of polymeric material, the strain pins 315 and the driver pin 316 form together the claw 312 of FIG. 3. When the first stop 310 is assembled, the strain pins 315 are located, for their upper part, in the housings 53a of the steel body 313 and, for their lower part, in the cap 314. For this, complementary housings 53b are provided in the cap 314, as is represented in the longitudinal cross-section view of FIG. 5B.

The pins 315, four in number in FIG. 4, make up the reinforcement of the claw 312 and support the mechanical strains upon extracting the splitter nose. They are, in this embodiment, made of steel. However, they are not directly in contact with the splitter nose, because their lower part is surrounded with polymer.

The cap 314 is attached to the body 313 by means of the driver pin 316 and two receiver holes 54a and 54b, arranged in the lower part of the body 313 and in the cap 314 respectively. The polymeric material is for example polyamide 6.

Making the claw 312 into several parts makes it possible to choose a more ductile material than metals to enter in contact with the splitter nose. The cap 314 of polymer will undergo wear and deformations in place of the splitter nose. Further, since the cap 314 can be easily removed from the first stop 310, it could be replaced, if need be, after several uses of the extracting tool. The strain pins 315 could also be replaced, should they are twisted or broken.

Thus, the claw 312 of the first stop 310 is designed, on the one hand, not to damage the splitter nose or neighbouring pieces thereof, such as the OGV inner shell, upon disassembling the splitter nose, and on the other hand, to be readily replaced at a lesser cost.

FIG. 6A to 6E illustrate steps S1 to S5 of the procedure for extracting a splitter nose 15, or any other metal piece having a profile longitudinal cross-section, by means of the tool 30.

Figure 6A:
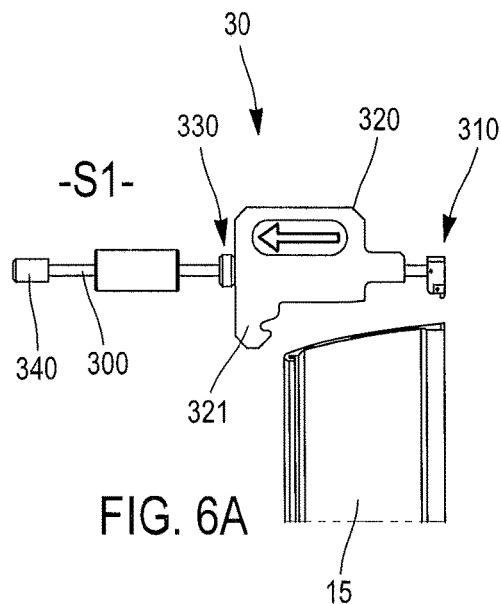
FIG. 6A to 6E represent steps of a method for extracting a metal piece by means of the extracting tool according to an embodiment of the invention.
Figure 6B:
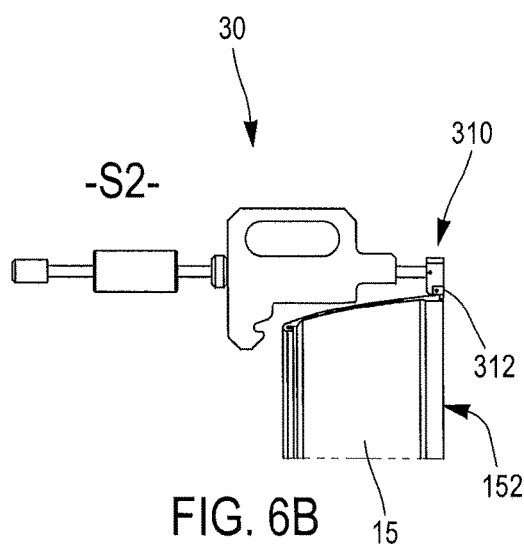
Figure 6C:
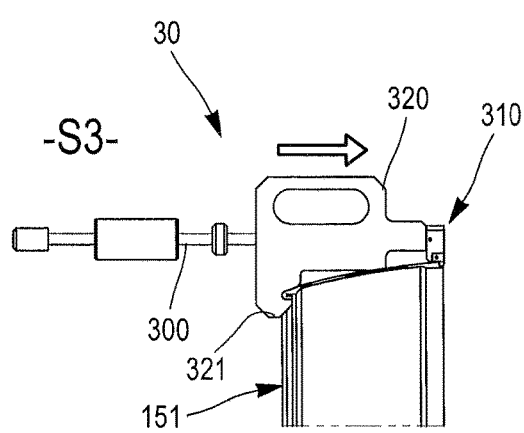

In step S1 of FIG. 6A, the tightening mechanism 330 is inactive (e.g. the nut 331 is unscrewed) and the gripping member 320 is moved along the rod 300 towards the second stop 340, in order to enlarge the space between the first portion 321 of the gripping member 320 and the first stop 310.

In S2 (FIG. 6B), the claw 312 of the first stop 310 is positioned against the downstream edge 152 of the splitter nose 15.

In S3 (FIG. 6C), the gripping member 320 is moved along the rod 300 towards the first stop 310, until the first portion 321 of the gripping member 320 grips the upstream edge 151 of the splitter nose 15.

Figure 6D:
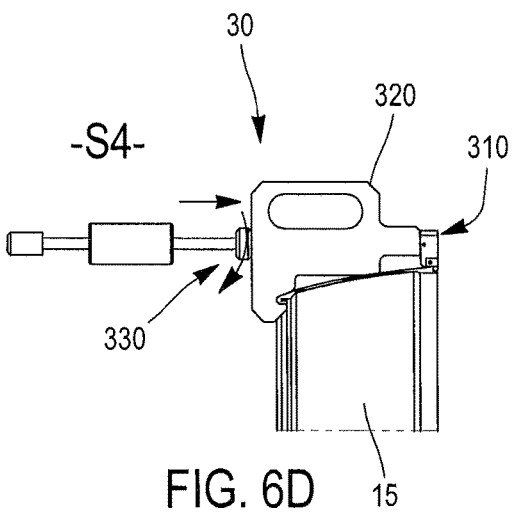

Then, the tightening mechanism 330 is actuated (e.g. the nut 331 is screwed) during a step S4 represented by FIG. 6D, so as to tighten the gripping member 320 against the splitter nose 15 and the first stop 310. Thus, the extracting tool 30 and the nose 15 become secured to each other.

Figure 6E:
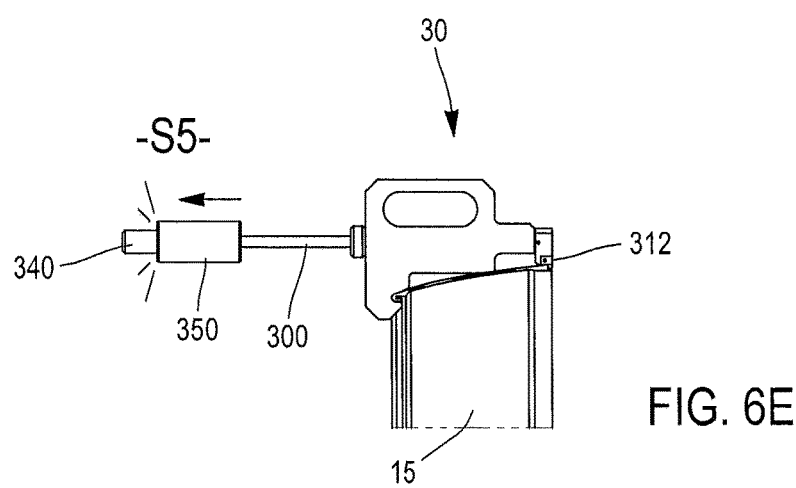

Finally, step S5 of FIG. 6E consists in exerting on the claw 312 the tensile force required to extract the splitter nose 15 from the assembly of the turbojet engine. This tensile force is for example achieved by moving the inertial mass 350 translationally mounted to the rod 300 until it strikes the second stop 340.

Since the splitter nose 15 is mounted tightened, by shrink fitting, to the shells of the turbojet engine, it may be desirable to strike several times the second stop 340 with the inertial mass 350, and thus the mass has to undergo several reciprocations along the rod 300. For the same reason, it may be desirable to perform the extraction procedure, i.e. repeating steps S1 to S5 thereabove, at several places of the downstream edge 152. These different catch points of the claw 312, for example three in number, are beneficially equidistantly distributed from each other on the perimeter of the circular downstream edge 152.

Thanks to the extracting tool according to embodiments of the invention, the number of damaged splitter noses during disassemblies of turbojet engines has dramatically decreased. Since a splitter nose is a particularly expensive piece to replace or repair, a reduction in the maintenance cost of the turbojet engines results therefrom.

The invention claimed is:

1. An extracting tool for extracting a metal piece located in an aerodynamic stream of a turbomachine, comprising:
    a rod;
    a first stop located at a distal end of the rod and provided with a claw for bearing against a first edge of the metal piece;
    a gripping member translationally mounted to the rod and comprising a central part and a first projecting portion which projects from the central part, the first projection portion radially projects from the claw of the first stop relative to a longitudinal axis of the rod and is arranged to receive a second, opposite edge of the metal piece;
    a tightening mechanism configured to keep the gripping member bearing against the metal piece and the first stop.

2. The tool according to claim 1, wherein the claw of the first stop comprises a metal reinforcement surrounded by a polymeric material.

3. The tool according to claim 1, wherein the gripping member includes a polymeric material.

4. The tool according to claim 1, wherein the gripping member further comprises a second portion arranged to bear against a wall of the metal piece, when the first projecting portion of the gripping member receives the second edge of the metal piece.

5. The tool according to claim 1, wherein the first projecting portion of the gripping member has a recess that is adapted to snugly fit to a second folded edge of the metal piece.

6. The tool according to claim 5, wherein the first projecting portion of the gripping member is hook-shaped.

7. The tool according to claim 1, comprising a handle arranged in the gripping member.

8. The tool according to claim 1, further comprising:
    a second stop located at a proximal end of the rod; and
    an inertial mass translationally mounted to the rod between the second stop and the tightening mechanism.

9. The tool according to claim 1, wherein the gripping member is further rotationally mounted to the rod.

10. The tool according to claim 1, wherein the extracting tool is adapted to extract a flow splitter nose.

11. A method for extracting a metal piece located in an aerodynamic stream of a turbomachine by means of a tool according to claim 1, comprising:
    positioning the claw of the first stop against a first edge of the metal piece;
    moving the gripping member along the rod so as to grip a second opposite edge of the metal piece with the first projecting portion;
    tightening the gripping member against the metal piece and the first stop by means of the tightening mechanism; and
    exerting on the claw a tensile force directed to a proximal end of the rod.

12. The method according to claim 11, wherein the metal piece is a flow splitter nose.

* * * * *